Dec. 20, 1927.
T. SMITH ET AL
1,653,233
METHOD AND APPARATUS FOR TESTING AND FINISHING OPTICAL ELEMENTS
Filed April 4, 1925          4 Sheets-Sheet 1
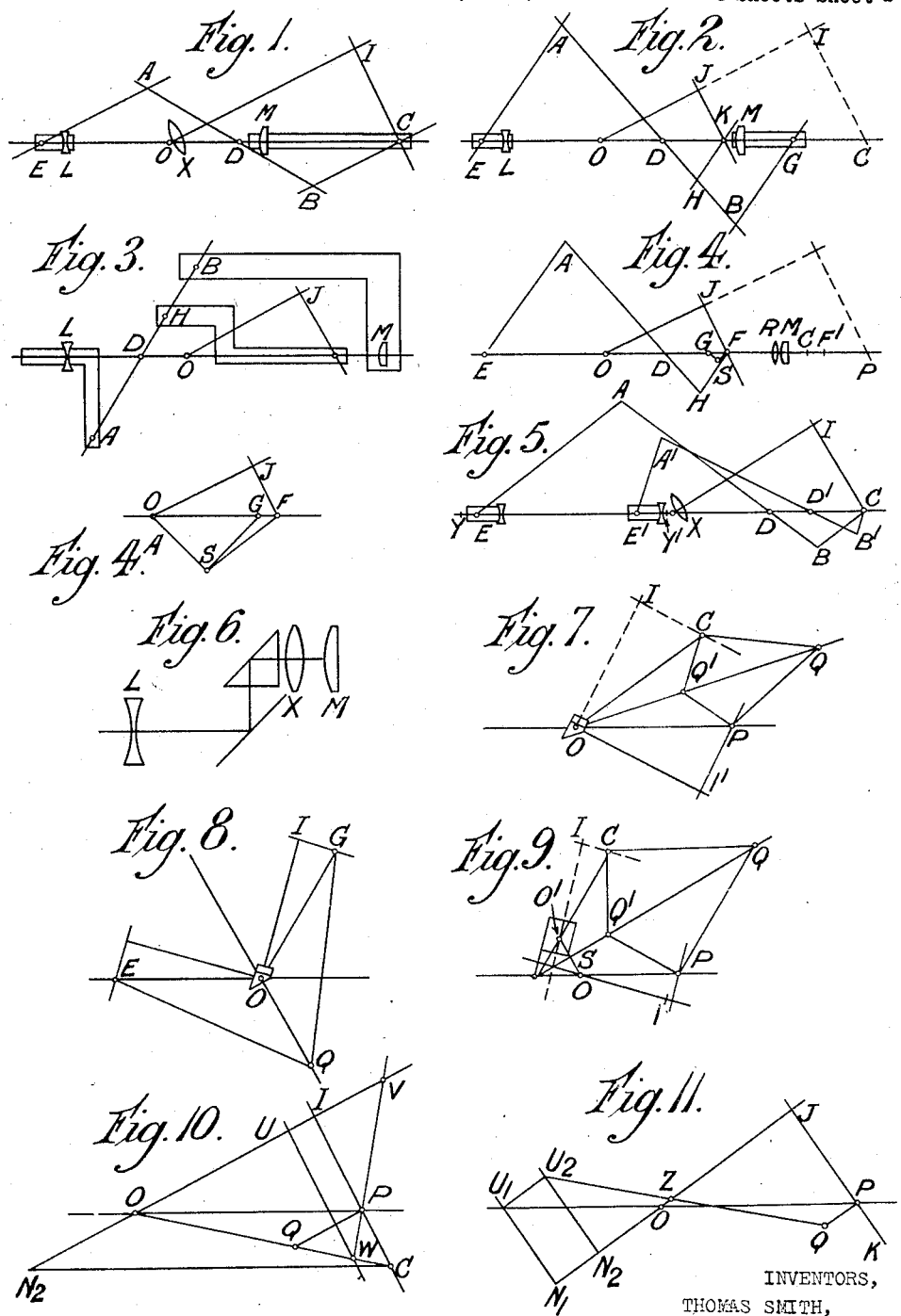
INVENTORS,
THOMAS SMITH,
JOHN HENDRI DOWELL,
By their Attorneys

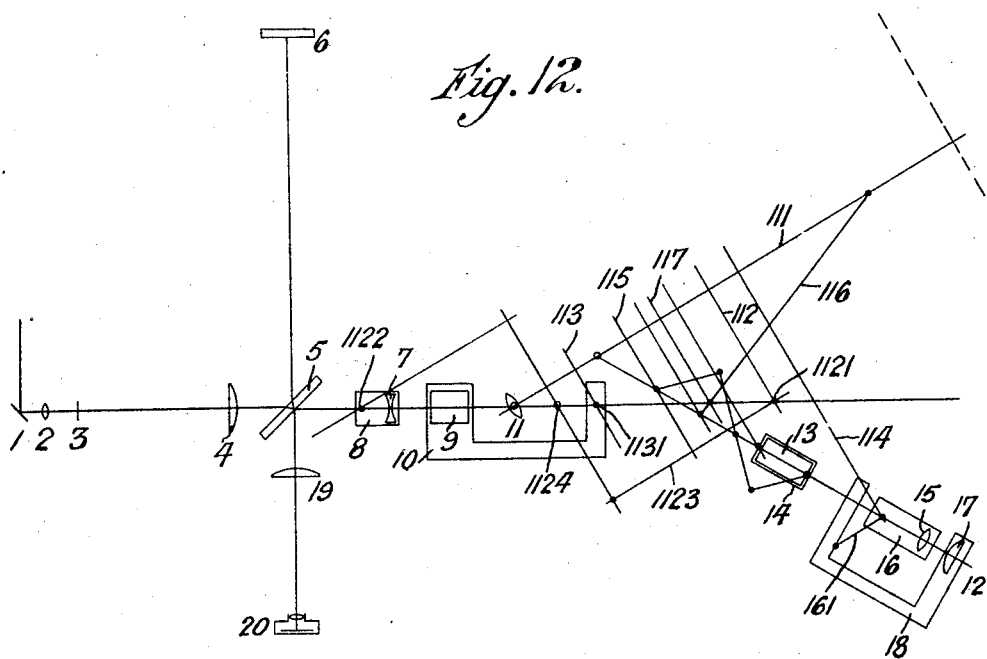

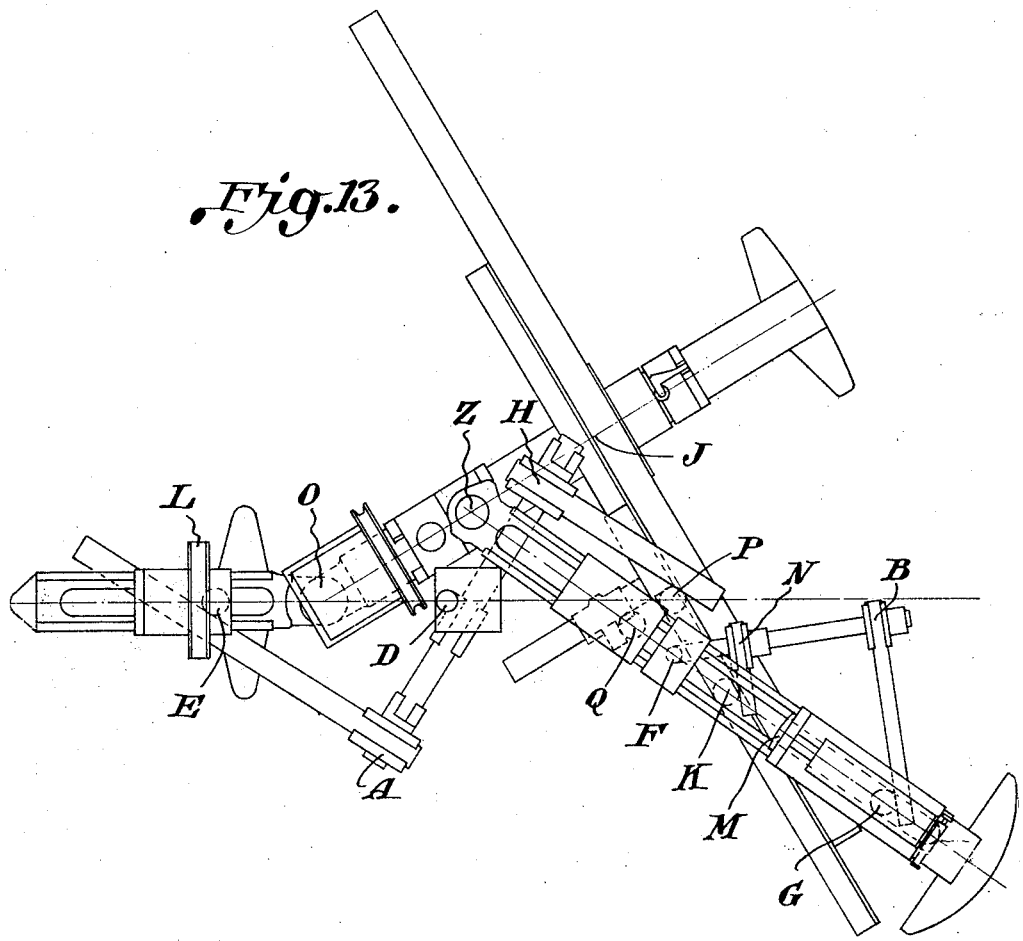

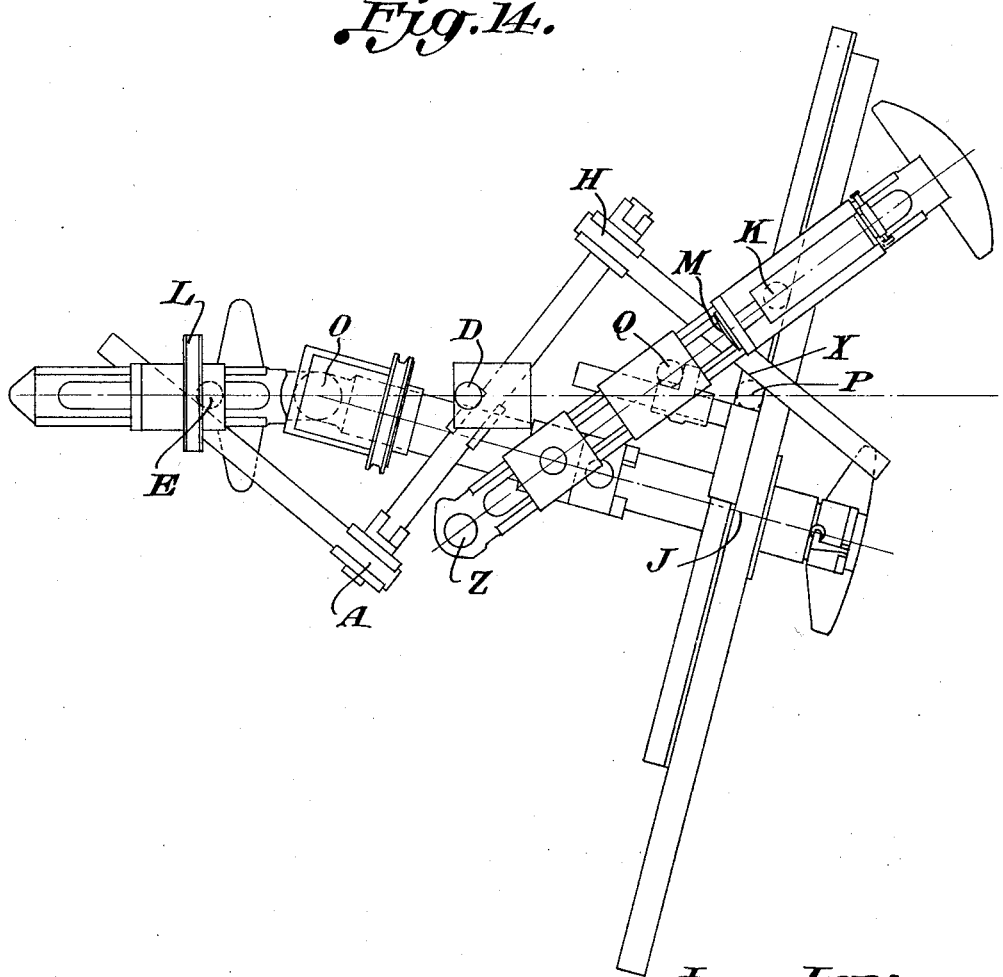

Patented Dec. 20, 1927.

1,653,233

UNITED STATES PATENT OFFICE.

THOMAS SMITH, OF TEDDINGTON, AND JOHN HENDRI DOWELL, OF LONDON, ENGLAND, ASSIGNORS TO ADAM HILGER, LIMITED, OF LONDON, ENGLAND.

METHOD AND APPARATUS FOR TESTING AND FINISHING OPTICAL ELEMENTS.

Application filed April 4, 1925, Serial No. 20,704, and in Great Britain April 8, 1924.

The present invention relates to the extension of methods of finishing and testing lenses in which the principle of rotating the lens under test about an axis to bring different parts of the image under examination is employed, and renders them applicable when the object is not remote from the lens and when the axes of the incident and emergent beams of light are not coincident. In the description of the way in which this aim is accomplished reference is made for the most part to a single method of testing, viz, that in which the image defects are measured by means of interference fringes as generally described in U. S. Patent No. 1,347,133. It must however be fully understood that this course is followed solely as a matter of convenience, and that this invention may be applied to other methods of testing and finishing.

In the apparatus described hereafter plane object and image surfaces are assumed, but tests for other surfaces may be made by substituting for the straight image bar another bar shaped to a principal section of the surface required. In general the distances of both the object surface and the image surface from the lens vary with the angle made with the lens axis by the straight joining an object point to its ideal image point.

Since the movements required in the object are similar to those imparted to the image receiver, it is evidently possible to carry out the examination of the lens for a finite magnification by providing on the object side of the lens apparatus for the movement of the object similar to that used on the image side for the movement of the receiver. This course is generally inconvenient as the whole apparatus becomes exceedingly bulky except for lenses of very short focal length. Other means of controlling the position of the object are therefore preferred.

The object which lies in the object surface is not necessarily real. Whatever its character it is convenient to refer to the object in the object surface as the immediate object, and the real object as the primary object. Thus in the apparatus described in U. S. Patent No. 1,347,133, the immediate object is at an infinite distance from the lens under test, and is obtained by placing the primary object, a small illuminated aperture, at the focus of a collimator. In addition we use the term intermediate object to designate any image of the primary object formed by optical means prior to the immediate object.

Whether the formation of intermediate objects is necessary depends on the method of test adopted. When interference methods are employed, an artificial star is used as the primary object, so that the wave fronts in the first instance are necessarily curved. It is desirable to deal with plane waves when the beam is separated into the two portions the ultimate reunion of which produces interference bands, so an intermediate object at an infinite distance is secured by placing the primary object at the focus of a collimator. When the object surface is supposed to be at infinity, so that the waves reaching the lens under test are required to be plane for all object points, no further transformation of the incident wave surfaces is required, and the indefinitely distant object will be the immediate object. On the other hand when the lens is to be tested for a finite magnification, that is for a near object, the waves falling on the lens must have finite curvature, so at least one further transformation is required to yield the immediate object, and the number of transformations may be still greater if a stationary intermediate object at a finite distance is required. In most other methods of test greater simplicity is possible on the object side of the lens under test because the appearance from which the corrections of the lens are derived is viewed on the image side of this lens instead of on the object side. In what follows it will be assumed that an infinitely distant intermediate object has been obtained (which may for some methods of test be the primary object) and is situated on the main axis of the apparatus.

When the intermediate object is at an infinite distance, the immediate object will be situated at the principal focus of any auxiliary optical system placed between the intermediate object and the lens under test. If this auxiliary system be moved as a whole along the main axis, the principal focus, that is the immediate object, will undergo equal displacements. The auxiliary system may be quite near the lens under test however distant the immediate object, and the required movements in the latter can thus be secured with apparatus of convenient dimensions. Relative movements between parts of the auxiliary system may also be made for the purpose of reducing the range of movement required.

The performance of the lens under test is judged from a knowledge of the primary object and the examination of the ultimate image or of some other appearance. Strictly this lens is only concerned with the transformation from the immediate object to the immediate image, and in order that correct inferences may be drawn from the appearances observed it is essential that all optical parts of the testing apparatus used to form successive objects and images shall introduce no appreciable aberration. For this reason it is very desirable that the axes of all incident light beams should be coincident or nearly coincident with the axes of the elements they meet. Thus all elements which are moved to secure the displacement of an object or image should be moved in the direction of their own axes and along the axis of the light incident upon them.

The movements of the auxiliary system may be controlled from an axial point in the image space, whether the actual image point or another point whose movements are smaller or greater. In this case the direction of movement of the auxiliary lens is usually opposite that of the point from which it is controlled, and the reversal may be obtained by the use of a hinged lever or an equivalent device.

This method of controlling the immediate object may be used when the lens is to be tested together with a reflector for reversing the image. The controlling point will continue to be on the main axis though the axis of the emergent light may lie in an altogether different direction. When the axis of the emergent beam of light diverges from the main axis, the image receiver and any other auxiliary optical apparatus used on the image side of the lens will be aligned and moved along the former axis. Various cases arise in testing well known types of instrument, and convenient means of retaining the said apparatus in the correct position in these cases are described.

In any case in which the object and image surfaces are not similar separate guides will be used, shaped in each case to cause the immediate object and the image receiver to follow appropriate paths.

The manner in which the correct relation is to be maintained between the immediate object, the lens under test, the image receiver and any other auxiliary apparatus will now be more particularly described by reference to the drawings.

Figures 1 to 12 inclusive illustrate diagrammatically various forms of the invention.

Figures 13 and 14 are plan views, somewhat diagrammatic in character, of two different embodiments of the invention.

In the apparatus described in the specification No. 1,347,133, the lens to be tested is turned upon a pivot by a rod which carries a straight bar, the rod and bar being at right angles. The mirror (image receiver) is capable of sliding in the direction of the axis of the beam of light emergent from the lens under test and its centre of curvature is maintained in contact with the bar by a weight. According to the present invention the lens forming the immediate object is similarly moved along the axis of the incident beam of light, and this may be effected by extending the rod towards the object and providing similar mechanism to the extended end of the rod. Such an apparatus would be too large for practical use with lenses of moderate and large focal lengths, and may be replaced by a lever whose arms are in the ratio of the magnification, which thus imparts to the immediate object (that is to the auxiliary lens) an axial movement which bears to the movement of the image point (i. e. the immediate image) a ratio equal to the reciprocal of the magnification. It will be noted that the ratio of the lever arms is the essential factor, and not their absolute lengths, so that a lever of any convenient length may be employed.

One form suitable for general use when the image point lies in the main axis of the apparatus is shown in Figure 1 of the diagrams annexed to the specification. The lens under the test requires to be rotated about a point which divides the distance between the nodal points in the ratio of the magnification.

In Figure 1 X is the lens under test, M the spherical mirror with its centre of curvature at C, and OI is the rod carrying the perpendicular bar IC which constrains C to lie in the desired image surface. The lever AB with fixed fulcrum at D on the main axis of the apparatus is so proportioned that $$m = \frac{DB}{DA},$$

where $m$ is the magnification at which lens X is to be examined. The length AB is selected with regard to the dimensions of the apparatus. At the points A and B bars AE and BC are set parallel to one another (not necessarily at right angles to AB). The bar BC is kept in contact with the pin C placed at the centre of curvature of the spherical mirror, and a pin E on the carriage bearing the auxiliary lens L is kept in contact with the other bar AE. Then since AED and BCD are similar triangles $$\frac{DC}{DE} = \frac{DB}{DA} = m$$

or $OC - m.OE = (1-m)OD$, a constant, O being the fixed point on the main axis about which the lens under test is rotated. This relation shows that the immediate object point, which moves as though rigidly attached to the auxiliary lens, will be displaced as desired.

Instead of the rigid lever systems AEDBC, a system of jointed rods may be used. In this case BC and AE would be fixed lengths and these members would be proportioned according to the magnification, their ends being attached at C and E to the mirror and lens carriages respectively. This system of rods may be duplicated to form a scissors type of lever for the movement of the auxiliary lens. Alternatively a pair of cams, whose linear dimensions are in the ratio of the magnification, may be similarly mounted with respect to an axis at D about which they rotate, their orientations being opposite. If these bear on axial points of the carriages of X and M respectively movements in the desired ratio will be secured. Such related movements may also be secured by the use of special cams designed to be mountable at any convenient part of the apparatus.

It may at times be necessary to test a lens on the apparatus when the distance of the image plane from the lens is too great to enable the centre of curvature of the mirror to be maintained in this plane by the means described above. Suitable control over the movement of the mirror in such cases is afforded by the use of a compound lever. In Figure 2, let I be the point of the image plane which lies on the axis OI of the lens, which is rotatable about an axis through O normal to the plane OIC. Let OJ be any convenient length on the bar OI. If $x = \frac{OJ}{OI}$, the motion at K produced by a cross bar at J will be $x$ times the motion at C produced by a cross bar at I, and therefore a lever giving the correct movement to the object lens by reference to a pin at K must have its ratio $x$ times that of a lever operating with reference to a pin at C. The ratio of the arms DH and AD must therefore be given by $\frac{DH}{DA} = mx$ and D is found by dividing EK in the same ratio when the axis of the lens under test coincides with the main axis. The mirror M must be so moved that its centre of curvature is at the inaccessible point C in the image plane IC and on the main axis. This may be done by extending the lever AH to B where $DB = \frac{DH}{x}$ and actuating the mirror carriage by a member BG which is kept parallel to HK and AE. As before this may be either a bar rigidly attached to AB or a rod of suitable length freely jointed at B and G. Similarly lenses of very short focus which, for mechanical reasons cannot be tested owing to the difficulty in getting the centre of curvature of the mirror at the correct distance from the axis of the lens, may be tested by a suitable lever reducing the motion obtained from a cross bar set at any convenient distance on the lens axis.

In order to make it clearly understood that any lever in which the ratio is constant may be used, Figure 3 illustrates another arrangement of the apparatus shown in Figure 2. In this case a plain straight lever is employed and pins or rollers are mounted on the carriage at distances from the main axis of the apparatus in proportion to the axial movements necessary in the parts to which they belong; alternatively the pins or rollers may be carried by the lever.

An alternative method which virtually locates the centre of curvature of a mirror at the image point on the main axis is illustrated in Figure 4. Light from the lens under test converging to the immediate image point P is intercepted by the lens R, and is refracted to an intermediate image which coincides with the centre of curvature of the mirror M. The lens R and the mirror M are mounted on separate carriages each of which may move along the axis of the apparatus. Their movements are so controlled that C, the centre of curvature of the mirror M, is always at the point conjugate to P in the lens R. A method of securing the proper relative movements of the two carriages consists in placing a pin or roller on the lens carriage at F, the front principal focus of the lens R. This pin is kept in contact with a bar JF rigidly attached at a convenient point J to the rod OI which rotates the lens under test. There is also pivoted on the pin at F a right angled lever one arm of which is constrained to lie along JF. The perpendicular member carries at a fixed point S a rod SG, freely hinged at S to the lever and at G to a point on the main axis of the mirror carriage. The length of the rod SG is equal to the length of the arm FS of the lever. The distance F'C between the second principal focus F' of the lens R and C the centre of curvature of the mirror M is made equal to the axial length FG. This arrangement may be varied by placing the pin S at twice its previous distance from F and causing it to bear against a plane face of the mirror carriage which meets the main axis normally at G. An alternative construction shown in Figure 4^A employing only freely jointed rods is obtained by connecting G to O by two equal rods OS and SG and coupling S and F by a jointed rod FS. The theory of this linkage depends on the condition $f^2 = FP \cdot CF'$ which is satisfied if P and C are conjugate points of the lens R of focal length $f$. FP is obviously equal to JI sec $\Theta$ where $\Theta$ is the angle between the main axis and that of the lens under test; according to the first construction FG is equal to 2 FS cos θ and the condition reduced to $f^2 = 2.FS.JI$; and according to the second construction the product FO.FG is constant, or since the ratio of FO to FP is equal to that of JO to JI, a constant ratio, the condition becomes $f^2 = F''G''.JI$ where F'' and G'' are the positions of F and G when the axis of the lens under test lies along the main axis of the apparatus. If a mirror of long radius is available it is evident that IJ may attain very large values while $f$ is of moderate length and CF' is comparatively small, thus permitting the actual apparatus to be confined to a region relatively near to O. As in the previous cases the pin at F together with a lever of suitable ratio enables the correct movements to be given to the object lens. Obviously other mechanisms giving inverse motions may be substituted for that described.

The foregoing arrangements are particularly suitable for testing and correcting process lenses which work at magnifications of from 1 to ½. The exceptional case of low magnification, with consequent large differences in the distances of object points may arise. This may be met by employing a compound object lens of two components of which the separation is variable. The mechanism illustrated in Figure 4 may be applied to this case, the leading component receiving displacements corresponding to those of the mirror M in the figure, and the second component displacements like those of the lens R. An alternative method consists in the use of more than one negative lens. Thus supposing that ABE in Figure 5 represents the position of the lever system when the limit of movement for the auxiliary lens has been reached at Y. Remove the object lens and move the carriage to Y', the other end of the available range; a lens of longer focal length may now be inserted and adjusted to bring the virtual object point to the correct position. The fulcrum of the lever system must also be readjusted, the new position of the fulcrum being such that the reduced distance CE', where E' is the new position of E, is divided at D' in the ratio of the magnification. This operation may be repeated as often as is necessary to include the range required.

Process lenses are frequently required to work with a prism, and though the lens and prism can be tested separately, and the performance of the combination deduced without difficulty, it may be desired to exhibit the properties of the two under working conditions by means of the interferometer. The prism is the optical equivalent of a rectangular slab of glass, and when such a slab of proper dimensions is available the test is most simply made by mounting it together with the lens and treating the two as a unit. This course obviates the change in the direction of the light produced by the reflection in the prism.

When a suitable piece of glass is not available, one possible course is to reflect the incident or the emergent light by a plane surface placed parallel to the reflecting face of the prism, so that the incident and the emergent beams remain parallel to one another but suffer a relative lateral displacement of a constant magnitude. This interval is preferably parallel to the axis about which the lens turns. This implies that the incident and emergent beams will ordinarily be at different levels, and a corresponding change in the level of the image receiver will enable the test to be carried out on the same principles as when no prism is present. The length of the arm of the lever system will be modified on account of the portion of the optical path lying between the two reflecting surfaces, which is in another plane from the rest of the path. The general arrangement of the apparatus in the vertical plane is indicated in Figure 6.

If the reflecting face of the prism is parallel to the axis about which the lens turns the image point lies off the main axis of the apparatus, the distance varying with the angle between the principal ray and the axis of the lens under test. The emergent axis of the reflected beam and the main axis of the apparatus make equal angles with the reflecting surface and with the normal to this surface. This indicates a number of suitable mechanisms for the control of the position of the mirror M, two of which are illustrated in Figures 7 and 8. In Figure 7 OI' represents the direction in which the axis of the lens would lie but for the prismatic reflection. I'P is the reflection of the image plane, P being on the main axis. As in previous cases the object lens may be controlled by levers operating on P. At an angle of 45° with OI' and rotating with it about O is a rod or other means of constraining points of a mechanism to lie in this line. On this line lie the common points Q and Q' of two pairs of equal links, QP and QC being one pair and Q'C and Q'P the other pair. These are connected to the point P on the one hand and to the centre of curvature C of the mirror M on the other hand. The mirror is also caused to pass through a suitable point on the actual lens axis OI. Figure 8 shows an arrangement in which cross bars are provided to both the original and the reflected lens axes. These are at equal distances from the point of rotation O. The object lens is moved by connection with the point where the former crosses the main axis at E, and a guide for the axis of the mirror M is obtained by attaching E and G to equal rods whose other ends are connected at Q which lies on the line OQ bisecting the angle between the two portions of the lens axis.

When the use of a prism involves an appreciable displacement of the apparent node O from the axis, a modification such as is shown in Figure 9, may be employed. Here O' is the actual point of crossing of principal rays on the lens axis O'I, and S is the image of O' in the reflector. The lens-prism system is rotated about S, which lies on the main axis. The loci of Q and Q' bisect internally or externally the angle between O'I and SI'½. In other respects the construction may be as already described. Other mechanisms which cause the emergent axis to revolve through twice the angle described by the lens axis may be employed.

In the cases so far illustrated it has been assumed that the examination can be carried out over the required field with the axis about which the lens is rotated passing through the centre of symmetry of the object and image surfaces. As has already been pointed out this centre divides the distance between the nodal points in the ratio of the magnification. It becomes evident at once that rotation about this point is only practicable when the nodal points are close to the lens surfaces, or more precisely when they are near the entrance and exit windows of the lens. Particular cases in which rotation about this point may not be possible occur with telephoto-lenses, where the nodal points are much in advance of the lens, and telescopes, where the nodal points are at infinity. The arrangement of the apparatus for testing such systems will now be considered.

The special features for which provision has to be made may be seen by considering a particularly simple case. Suppose that the object surface is at an infinite distance, and that the lens to be examined is of the telephoto type. The image point will be situated where a straight line through the second nodal point parallel to the main axis intersects the focal plane. If the lens is rotated about this nodal point the image point will lie in the main axis. Since the centres of the entrance and exit windows are distant from the nodal point, these windows will receive considerable lateral displacements as the lens is rotated. If the incident wave front is of limited dimensions, as for example when the plane wave is derived from a collimator, this movement may prevent the entrance window from being filled with light, and as the rotation is increased no light whatever may enter the lens. In addition to this difficulty the lateral displacement of the exit window in conjunction with the location of the image point on the main axis shows that the axis of the emergent light becomes considerably inclined to the main axis in the outer parts of the field of view. The obliquity may be sufficient to prevent the transmission of the refracted light through an examining instrument such as a microscope, and in any case such oblique transmission is unacceptable for the reason given earlier in this specification that it may vitiate the test. Rotation about some other point of the lens axis may enable the entrance window to be filled with light, but will have no effect on the obliquity of the axis of the refracted beam of light, and will cause the image point to be displaced from the main axis. That corresponding effects are found with telescopes follows from the customary definition of magnifying power in terms of angular magnification. It is readily seen that in a satisfactory solution of this problem the lens will be rotated about an axis passing through the centre of the entrance window, and that a new method must be provided for the location of the auxiliary apparatus on the image side of the lens. The change in the position of the axis of rotation, it should be observed, will not modify the method of controlling any auxiliary apparatus on the object side of the lens under test. The movements of such apparatus will be controlled as before by reference to the point where the main axis intersects a given image surface. Taking the case in which the image receiver is a mirror, the problem for solution is the construction of mechanical constraints which will cause the axis of the mirror to lie along the axis of the emergent beam of light and its centre to be at the point where this axis meets the image surface. The axis will naturally be made to pass, approximately at all events, through the centre of the exit windows, which is a known point on the lens axis. The centre of curvature may be retained in the image surface by the means used heretofore, and it then only remains to determine by a convenient mechanism a second point on the emergent axis to complete the solution of the problem.

A specially simple case may be considered in the first place. In Figure 10 the entrance and exit windows are both assumed to have their centres at O, and the lens is rotated about an axis passing through this point by means of the rod OI which is parallel to the lens axis. The object is assumed to be at an infinite distance, and OP is the continuation of the axis of the incident light. Let IP be in the focal plane. Then the axis of the emergent light, instead of lying along OP, takes the position OC where $N_2C$ is the line drawn from the second nodal point $N_2$ parallel to the incident light to meet the image plane in C. Through P, the point in which the main axis meets the image plane, draw PQ parallel to the lens axis to meet OC in Q. Then since PQ and OI are parallel $$\frac{PQ}{IO} = \frac{CP}{CI}$$

and since OP and $N_2C$ are parallel $$\frac{CP}{CI} = \frac{N_2O}{N_2I}$$

so that $$\frac{PQ}{IO} = \frac{N_2O}{N_2I}$$

or $$\frac{1}{QP} = \frac{1}{N_2O} + \frac{1}{OI}$$

It follows that the length PQ is constant. If now any line UW parallel to IC and at a constant distance from it meets OC in W, since W divides QC in a constant ratio, the join WP will meet the lens axis OI in a fixed point V. These facts give the two following methods of controlling mirror carriage.

The axis of the mirror carriage has a slot by means of which it is made to pass through the centre of the exit window O, the slot embracing the axis about which the lens carrier turns. At C, the centre of curvature of the mirror there is fixed a pin on the carriage which engages with a slot on the image bar IPC. A right angled lever has one limb confined in this image bar slot, and at the angle bears a pin by which the angular point is kept on the main axis of the apparatus at P. At a fixed distance from the angular point P, the other limb of this lever carries a stud Q which engages in the slot of the mirror carriages. Alternatively the right angled lever is replaced by a straight lever WPV which is constrained by pins to pass through a fixed point V on the lens axis and through P, the point in which the image plane crosses the main axis of the apparatus, and carries a third pin W which engages with the slot in the mirror carriage and also in a slot UW at a fixed distance from the image plane.

These two mechanisms are applicable to a much more general case than that just considered. In Figure 11, $N_1$ and $N_2$ are the two nodal points of the lens under test which is rotatable about the point O, the centre of the entrance window, and JPK is in a transverse plane normal to the lens axis. The axis of the incident beam meets the first principal plane in $U_1$, and the transverse plane in P. The principal ray of the reflected beam will pass from Z the centre of the exit window and to the order of accuracy necessary for setting up the apparatus it is permissible to assume that Z is the image of O. If then $U_2$ is the image of $U_1$, so that $U_2N_2$ is equal to $U_1N_1$, the emergent ray corresponding to the incident ray $U_1O$ is $U_2Z$.

Let this meet the transverse plane in K and let it be met by the line through P parallel to the axis in Q. Then from similar triangles $$\frac{PQ}{JZ} = \frac{KP}{KJ};$$

also $$\frac{KJ}{U_2N_2} = \frac{ZJ}{ZN_1}$$

and $$\frac{PJ}{U_1N_1} = \frac{OJ}{ON_1}$$

It at once follows that $$PQ = JZ - JO\frac{N_2Z}{N_1O} = JZ - JO.s,$$

where $s$ is the transverse magnification at Z or the reciprocal of the angular magnification. Thus PQ is a constant length for any one transverse plane, and the two constructions given above for a simple case are generally applicable. Special cases offering simple constructions are obtained when Q lies in the self-conjugate plane, so that the length PQ is zero, and when Q or W is in the image plane, and thus coincides with the centre of curvature.

The use of the constant length rod PQ may be regarded as a special case of the other construction, the point V being at an infinite distance.

From this method of treating the problem it is evident that it is applicable whenever the principal rays of a beam satisfy the condition that the ratio of the tangents of the angles they make with the axis before and after refraction is constant. The value of the focal length is quite immaterial, and may be infinitely great, that is to say a telescope may be tested by this means. When the object considered is at an infinite distance the emergent beam is theoretically plane, but it does not follow that a plane mirror should be used to reflect back the light through the instrument. In actual instruments departures from flatness in the waves will occur, and to render these measurable a compound reflector, consisting of a lens and a spherical mirror whose separation is adjustable, is preferable. When the images of near objects are under examination a simple curved mirror, usually concave, may be used as with other types of lenses.

The constructions of Figures 12 and 13 are in reality slight modifications of the previous mechanisms, the guide bar for P being curved instead of straight.

Figure 18 illustrates diagrammatically the use of an apparatus constructed according to this invention for testing by interference a lens of long focal length for a finite magnification, the entrance and exit windows being remote from the principal points. Monochromatic light is reflected by the mirror 1 on to the condensing lens 2 which focusses an image of the source on the diaphragm 3 at the focus of the collimating lens 4, from which the light issues as a parallel beam to the plane parallel plate 5, which is half silvered on one face. The reflected beam encounters a mirror 6, mounted on a carriage which may slide along grooves parallel to the direction in which the light travels, so that the distance of the mirror from the plane parallel plate may be set to any suitable interval, and this mirror reflects the light back to the plane parallel plate. The transmitted beam passes through the negative lens 7 which is mounted on a carriage 8, then through the telescope 9 which is supported on the carriage 10, and thence travels to the lens under test 11. The carriages 8 and 10 are free to travel in the direction of the incident light, which coincides with the axes of the lens 7 and the telescope 9. The method by which these carriages are moved will be described later. After passing through the lens 11 the axis of the emergent beam will in general not coincide with that of the incident beam. The emergent axis is denoted in the figure by 12. Along this axis the light in turn encounters the telescope 13 the lens 15 and the mirror 17 mounted on the carriage 14, 16 and 18, respectively. These carriages are capable of movement parallel to the emergent axis 12. After reflection at 17 the light travels back along its previous path through 15, 13, 11, 9, and 7 to the plane parallel plate 5, where as an approximately plane wave it unites with the beam from the mirror 6, forming interference bands. Some of the light of these beams reaches the lens 19 by which an image of the diaphragm 3 is formed. The eye may be placed here to view the interference bands, or they may be photographed by a camera 20.

The positions of the optical auxiliaries 7, 9, 13, 15, is determined as follows. The lens 11 is rotated about an axis to bring different parts of the field of view under test by means of the rod 111 to which are attached a number of cross bars. The cross bars 112 and 113, similar in shape to a section of the object surface, have pins 1121 and 1131 kept in contact with them on the axis of the incident beam of light. A fixed point of the carriage 10 is maintained in contact with 1131, and a fixed point of the carriage 8 on the incident axis is kept in contact with the pin 1122 which is made to undergo displacements which are a constant multiple of those of 1121 but in the opposite direction by means of the constant ratio lever 1123 hinged at the fixed point 1124 on the axis of the incident beam of light.

By adjusting either of the cross bars 112 and 113, or the ratio of the lever, the light falling on lens 11 may be made to diverge from any surface similar in section to these cross bars.

In a similar way the carriages 14 and 16 are located by means of cross bars 115 and 114 fixed to the rod 111 and similar in shape to a section of the image surface. The points of these bars from which the motions are derived lie in the emergent axis 12. The telescope 13 modifies the range of movement required in the elements 15 and 17 without modifying their character. The point of contact of the carriage 16 with the cross bar 114 is at the front principal focus of lens 15. At this point is attached a constant length lever 161 maintained parallel to the lens axis 111, against the other end of which a shaped face of the carriage 18 presses. In the normal case of a plane image this face is plane and perpendicular to the emergent axis 12. As on the object side there are several degrees of freedom in setting up the apparatus.

The direction of the emergent axis 12 is determined by means of a rod 116 jointed at a fixed point of the rod 111, which also passes through the intersection of the incident axis with a bar 117 carried by the rod 111. The axis 12 is made to pass through a fixed point of 111 and either a fixed point of 116 or a point in which 116 meets another bar carried by 111.

Just as it is usually impracticable to locate the immediate object directly on account of its distance, it may for a similar reason be necessary to locate the image receiver without access to the image plane. This may be effected by using a constant magnification lever hinged to a fixed point of the axis of the emergent beam of light, one arm of which bears against a point which moves along the emergent axis at a rate equal to that desired in the image receiver divided by the ratio of the lever arms.

In general the axes of the incident and emergent beams of light are not coincident. If the axis of the incident beam is considered for convenience to occupy a fixed position, the lens will most suitably be rotated about an axis passing through the centre of the entrance window and normal to the axis of the incident beam. The axis of the emergent beam will pass through the centre of the exit window, a fixed point on the lens axis, and through a point which may be located by means of a right angled lever as described hereafter. This determines the axis of the image receiver. Its position along this axis is determined either by the image surface directly or by the constant ratio lever already mentioned. An apparatus constructed in accordance with this invention is shown in plan in Figure 13.

The lens under test is rotatable about an axis through O by means of the rod OJ which lies in the direction of the lens axis. This rod carries a bar JPK clamped to it at right angles, which is therefore parallel to the object and image surfaces. The chief ray of the incident beam of light lies in the line EODP, and the position of the immediate object is controlled by means of the lever ADH hinged at the fixed point D in the line of the incident chief ray. This lever carries parallel cross arms AE and HP at A and H. The arm HP is kept in contact with a pin P at the intersection of the bar JPK with the line of the incident chief ray (or main axis), and the lens L which forms the immediate object is mounted on a carriage movable along the main axis and detained by the contact of a pin E with the arm AE.

The image receiver is constrained to move along a bar ZF, which passes through the centre of the exit window Z of the lens under test. Accordingly the bar ZK is hinged about an axis Z carried by the rod OJ. A second point of ZF is obtained by causing the bar to maintain contact with the roller Q at the end of a bar PQ of fixed length which meets JPK at right angles at P, the intersection of JPK with the main axis. The position of the image receiver M along the bar ZF is determined by a lever FNB hinged at F, a fixed point of the bar ZF, which carries at N and B two parallel arms NK and BG. The arm NK is kept in contact with a roller K at the intersection of the bar ZF with the arm JPK, and a roller G on the carriage of the image receiver M is maintained in contact with the arm BG.

Figure 13 shows the general arrangement of an interferometric apparatus constructed in accordance with this invention. For the sake of clearness the various levers, which are detachable fittings, have been omitted from this figure. The parts of the apparatus for the separation of the incident light with a view to the ultimate formation of interference fringes are generally similar to those described in U. S. Patent No. 1,347,133. The chief alterations are the introduction between the interferometer mirror and the lens under test of the carriage for the auxiliary lens and the ways upon which it moves, which are bolted to the base of the apparatus: the replacement of the fixed ways along which the mirror carriage slid, by two pairs of ways, one fixed to the base and in line with the ways for the auxiliary lens carriage, while the other, which takes the mirror carriage, may be hinged at O and secured by a pin at the other end so as to lie along the main axis, or be hinged at O or alternatively at any point Z of OJ with the other end free; and the increased separation of the horizontal planes in which the axes of the various ways, rods, and bars lie so as to provide space for detachable fittings such as the levers, their arms, and the carriages carrying the pivots on which they are mounted.

The further diagrams illustrate the use of the detachable fittings. For the sake of simplicity most of these figures show only one set of these fittings for the attainment of a single end. In practice these simpler arrangements of the apparatus are very common owing to the properties usually associated with one another in the normal types of lens. Thus with optical systems in which the axes of the incident and emergent beams are not nearly coincident the distance from the optical elements to the image is generally small, so that the bar JPK may coincide with the image surface itself as in Figure 14. There is then no need for the lever system hinged at F, as the mirror carriage will be properly positioned by bearing against the pin at K. Reciprocally systems which form images distant from the optical elements as a rule have their incident and emergent axes approximately in coincidence, so that ZK coincides with OP. F is now a fixed point on the main axis, and the set up may be so arranged that D and F are the same point. Since K and P are now the same point the levers AH and BF may become a single lever, say AH, which will then have a third arm parallel to the other two to control the position of the mirror M. When the axes ED and ZF diverge and the image is distant from the optical elements the instrument is nearly always intended to be used with distance objects, so that the lens L and the lever system EADHP for controlling its position will not be used. The apparatus is designed to take full advantage of the simplifications made possible by these circumstances.

In practice it is often possible to eliminate some of these movements by utilizing special cases. For instance the telescopes serve no function if their magnifying powers are ± 1. In other cases the points at which one or more of the cross bars are attached may be at the intersection of two axes, so that the corresponding carriages are at rest on their axes. Nevertheless it is advantageous to possess the degrees of freedom which have been pointed out, since the range of tests possible with given equipment is thereby extended.

Other laws may be treated by appropriate means, for example a constant ratio of the actual angles may be secured by means of rolling contacts or by means of inextensible bands passing round discs or sectors of different diameters. In this way the interferometer and other types of apparatus can be made available for testing all varieties of optical instruments.

In the claims the words "optical element" are intended to include lenses, prisms or mirrors, or combinations of these such as telescopes; the words "optical systems" are intended to include a lens or system of lenses including a telescope; and the words "image receiver" are intended to include a mirror or lens or system of lenses or a photographic plate or a metal plate upon which the image is received. In the claims also when the words "varying the distance" between the "object or image receiver and the lens" occur, it is not the actual distance which is intended but the effective distance.

What we claim is:—

1. In the testing and finishing of optical elements, where the angle made by the axis of the beam of light incident on the element with the element is varied for the examination of different parts of its field, arranging the axis of rotation to pass approximately through the centre of the entrance window of the element, and causing the effective object and the image receiver to assume positions, determined by the said angle, on the axis of the incident light beam and on an axis passing approximately through the centre of the exit window and through the image of the effective object respectively, so as to maintain the effective object in a predetermined object surface and the image receiver in correct adjustment with respect to the conjugate image surface.

2. In the testing and finishing of optical elements having the axes of the incident and emergent light beams approximately coincident, where an image receiver is displaced in a straight line with the incident axis and the angle made by this axis with the element is varied for the examination of different parts of its field, producing an effective object on the incident axis at a finite distance from said element with the aid of an optical system, and causing said effective object to be displaced conjointly with the displacement of said image receiver and with the rotation of said element so as to maintain the effective object in a predetermined object surface and the image receiver in correct adjustment with respect to the conjugate image surface.

3. In the testing and finishing of optical elements having the axes of the incident and emergent light beams approximately coincident, where an image receiver is displaced in a straight line with the incident axis and the angle made by this axis with the element is varied for the examination of different parts of its field, producing an effective object on the incident axis at a finite distance from said element with the aid of an optical system, and causing said effective object to be displaced conjointly with the displacement of said image receiver and with the rotation of said element so as to maintain the effective object in the object surface corresponding to a predetermined magnification and the image receiver in correct adjustment with respect to the conjugate image surface.

4. In the testing and finishing of optical elements having the axes of the incident and emergent light beams approximately coincident, where an image receiver is displaced in a straight line with the incident axis and the angle made by this axis with the element is varied for the examination of different parts of its field, producing an effective object on the incident axis at a finite distance from said element with the aid of an optical system, and causing said effective object to be displaced conjointly with the displacement of said image receiver and with the rotation of said element so as to maintain a predetermined linear relation between the distances of the said axis of rotation from the effective object and the image receiver respectively.

5. In the testing and finishing of optical elements, where the angle made by the axis of the beam of light incident on the element with the axis of the element is varied for the examination of different parts of its field, arranging the axis of rotation to pass approximately through the centre of the entrance window of the element, and causing the effective object and the image receiver to assume positions, determined by the said angle, on the axis of the incident light beam and on an axis passing approximately through the centre of the exit window respectively, a selected point of the image receiver also lying in a predetermined image surface and on a straight line passing through the effective object and through a fixed point on the axis of the element.

6. In the testing and finishing of optical elements, where the angle made by the axis of the incident beam of light with the optical axis of the element on the incident side is varied for the examination of different parts of its field, arranging the axis of rotation to pass approximately through the centre of the entrance window of the element, and causing the effective object and the image receiver to assume positions, determined by the said angle, on the axis of the incident beam and on an axis passing approximately through the centre of the exit window respectively, a selected point of the image receiver also lying in a predetermined image surface and at a distance from the optical axis of the element on the emergent side which bears an assigned ratio to the distance of the effective object from the optical axis of the element on the incident side.

7. Apparatus for testing and finishing optical elements comprising a holder for the optical element to be tested, means for rotating said holder about a fixed axis, an object, an optical system between the object and the element under test, an image receiver, means co-acting with said first mentioned means for displacing said optical system and said image receiver so that the distances from said fixed axis of said optical system and said image receiver vary but satisfy a predetermined linear relationship.

8. Apparatus for testing and finishing optical elements comprising a holder for the optical element to be tested, means for rotating said holder about a fixed axis, an object, an optical system between the object and the element under test, an image receiver, a constant ratio lever turning about a fixed axis for displacing said optical system and said image receiver, said lever co-acting with said first mentioned means.

9. Apparatus for testing and finishing optical elements comprising a holder for the optical element to be tested, means for rotating said holder about a fixed axis, an object, two optical systems between the object and the element under test, an image receiver, and means co-acting with said first mentioned means for displacing one of said optical systems and said image receiver so that the distances from said fixed axis of said movable optical system and said image receiver vary but satisfy a predetermined linear relationship.

10. Apparatus for testing and finishing optical elements comprising a holder for the optical element to be tested, means for rotating said holder about a fixed axis, an object, two optical systems between the object and the element under test, an image receiver, and a constant ratio lever turning about a fixed axis for displacing said movable optical system and said image receiver, said lever co-acting with said first mentioned means.

11. Apparatus for testing and finishing optical elements comprising a holder for the optical element to be tested, means for rotating said holder about a fixed axis, an object, an optical system between the object and the element under test, an image receiver, and a coupling connecting said optical system and said image receiver.

12. Apparatus for testing and finishing optical elements comprising a holder for the optical element to be tested, means for rotating said holder about a fixed axis, an object, two optical systems between the object and the element under test, an image receiver, and a coupling connecting one of the said optical systems to said image receiver.

13. Apparatus for testing and finishing optical elements comprising a holder for the optical element to be tested, means for rotating said holder about a fixed axis, an object, an optical system between the object and the element under test, an image receiver, a carriage for said optical system, a carriage for said image receiver, a rod carried by said holder, a cross bar carried by said rod abutting against one of said carriages, and a pivoted lever carrying cross bars abutting against said carriages respectively.

14. Apparatus for testing and finishing optical elements comprising a holder for the optical element to be tested, means for rotating said holder about a fixed axis, an object, two optical systems between the object and the element under test, an image receiver, a carriage for one of said optical systems, a carriage for said image receiver, a rod carried by said holder, a cross bar carried by said rod abutting against one of said carriages, and a pivoted lever carrying cross bars abutting against said carriages respectively.

15. Apparatus for testing and finishing optical elements comprising a holder for the optical element to be tested, means for rotating said holder about a fixed axis, means for producing an effective object, a bar turning about a point fixed relatively to said holder, an image receiver adapted to slide along said bar, and means for turning said bar co-acting with said means for rotating said holder.

16. Apparatus for testing and finishing optical elements comprising a holder for the optical element to be tested, a rod for rotating said holder about a fixed axis, means for producing an effective object, a bar adjustably mounted on said rod, a second bar turning about a fixed point of said rod, an image receiver adapted to slide along said second bar, and means for constraining said second bar to pass through the point in which said first bar meets the straight line through the said effective object and the axis about which the said holder rotates.

17. Apparatus for testing and finishing optical elements comprising a holder for the optical element to be tested, a rod for rotating said holder about a fixed axis, a bar adjustably mounted on said rod, a right angled lever one arm of which is adapted to slide along said bar while the angular point describes a straight line, a second bar rotatable about a fixed point of said rod and engaging with the second arm of said right angled lever, and an image receiver adapted to slide along said second bar and to maintain contact with the first bar.

18. Apparatus for testing and finishing optical elements comprising a holder for the optical element to be tested, a rod for rotating said holder about a fixed axis, two bars adjustably mounted on said rod, a third bar rotatable about a fixed point of said rod and constrained to pass through a point determined by the intersection of the first bar with a fixed axis, a fourth bar rotatable about a fixed point of said rod and constrained to pass through a point determined by the intersection of the second and third bars, and an image receiver adapted to slide along the fourth bar and to maintain contact with the first bar.

19. Apparatus for testing and finishing optical elements comprising a holder for the optical element to be tested, means for rotating said holder about a fixed axis, an optical system serving to produce an effective object at a finite distance from the optical element, a mirror to bring the effective incident and emergent axes of the element into parallel planes, an image receiver, and a linkage system connecting said means, said optical system and said image receiver whereby predetermined displacements of said optical system and said image receiver are made in planes at right angles to said fixed axis as said holder is rotated.

20. Apparatus for testing and finishing optical elements comprising a holder for the optical element to be tested, means for rotating said holder about a fixed axis, an optical system serving to produce an effective object at a finite distance from the optical element, an image receiver, a fixed bar lying in a direction bisecting the angle between the incident and emergent axes of the element, and a linkage system connecting said means, said optical system, said image receiver and said fixed bar whereby predetermined displacements of said optical system and said image receiver are made in a plane at right angles to said fixed axis as said holder is rotated.

21. Apparatus for testing and finishing optical elements comprising apparatus adapted to produce interference, an optical system to impose finite curvature on light waves, a holder for the optical element to be tested, means for rotating said holder about a fixed axis, a spherical mirror, and means co-acting with the first said means serving to displace said optical system and said mirror so that the distances from said fixed axis of said optical system and the centre of curvature of the mirror vary but satisfy a predetermined linear relationship.

22. Apparatus for testing and finishing optical elements, comprising apparatus adapted to produce interference, an optical system to impose finite curvature on light waves, a holder for the optical element to be tested, means for rotating said holder about a fixed axis, a spherical mirror, and a constant ratio lever turning about a fixed axis for displacing said optical system and said image receiver, said lever co-acting with said first mentioned means.

23. Apparatus for testing and finishing optical elements comprising apparatus adapted to produce interference, an optical system to impose finite curvature on light waves, a holder for the optical element to be tested, means for rotating said holder about a fixed axis, a telescope between said optical system and said element, a spherical mirror, and means co-acting with the first said means serving to displace said telescope and said mirror so that the distances from said fixed axis of said telescope and the centre of curvature of said mirror vary but satisfy a predetermined linear relationship.

24. Apparatus for testing and finishing optical elements comprising apparatus adapted to produce interference, an optical system to impose finite curvatures on light waves, a holder for the optical element to be tested, means for rotating said holder about a fixed axis, a telescope between said optical system and said element, a spherical mirror, and a constant ratio lever turning about a fixed axis for displacing said movable optical system and said spherical mirror, said lever co-acting with said first mentioned means.

25. Apparatus for testing and finishing optical elements comprising apparatus adapted to produce interference, an optical system to impose finite curvature on light waves, a holder for the optical element to be tested, means for rotating said holder about a fixed axis, a telescope between said optical system and said element, a spherical mirror and a coupling connecting said telescope to said mirror.

26. Apparatus for testing and finishing optical elements comprising apparatus adapted to produce interference, an optical system to impose finite curvature on light waves, a holder for the optical element to be tested, means for rotating said holder about a fixed axis, a spherical mirror, a carriage for said optical system, a carriage for said mirror, a rod carried by said holder, a cross bar carried by said rod abutting against one of said carriages, and a pivoted lever carrying cross bars abutting against said carriages respectively.

27. Apparatus for testing and finishing optical elements comprising apparatus adapted to produce interference, an optical system to impose finite curvature on light waves, a holder for the optical elements to be tested, means for rotating said holder about a fixed axis, a telescope between said optical system and said element, a spherical mirror, a carriage for said telescope, a carriage for said mirror, a rod carried by said holder, a cross bar carried by said rod abutting against one of said carriages, and a pivoted lever carrying cross bars abutting against said carriages respectively.

28. Apparatus for testing and finishing optical elements comprising apparatus adapted to produce interference, a holder for the optical element to be tested, means for rotating said holder about a fixed axis, a bar turning about a point fixed relatively to said holder, a spherical mirror adapted to slide along said bar, and means for turning said bar co-acting with said means for rotating said holder.

29. Apparatus for testing and finishing optical elements comprising apparatus adapted to produce interference, a holder for the optical element to be tested, a rod for rotating said holder about a fixed axis, a bar adjustably mounted on said rod, a second bar turning about a fixed point of said rod, a spherical mirror adapted to slide along said second bar, and means for constraining said second bar to pass through the point in which said first bar meets the straight line through the said apparatus adapted to produce interference and the axis about which the said holder rotates.

30. Apparatus for testing and finishing optical elements comprising apparatus adapted to produce interference, a holder for the optical element to be tested, a rod for rotating said holder about a fixed axis, a bar adjustably mounted on said rod, a right angled lever one arm of which is adapted to slide along said bar while the angular point describes a straight line, a second bar rotatable about a fixed point of said rod and engaging with the second arm of said right angled lever, and a spherical mirror adapted to slide along said second bar and to maintain the centre of curvature of said mirror contiguous with the first bar.

31. Apparatus for testing and finishing optical elements comprising apparatus adapted to produce interference, a holder for the optical element to be tested, a rod for rotating said holder about a fixed axis, two bars adjustably mounted on said rod, a third bar rotatable about a fixed point of said rod and constrained to pass through a point determined by the intersection of the first bar with a fixed axis, a fourth bar rotatable about a fixed point of said rod and constrained to pass through a point determined by the intersection of the second and third bars, and a spherical mirror adapted to slide along the fourth bar and to maintain the centre of curvature of said mirror contiguous with the first bar.

32. Apparatus for testing and finishing optical elements comprising apparatus adapted to produce interference, a holder for the optical element to be tested, means for rotating said holder about a fixed axis, an optical system between said interference apparatus and said element, a mirror to bring the effective incident and emergent axes of the element into parallel planes, a spherical mirror, and a linkage system connecting said means, said optical system and said spherical mirror, whereby predetermined displacements of said optical system and said spherical mirror are made in planes at right angles to said fixed axis as said holder is rotated.

33. Apparatus for testing and finishing optical elements comprising apparatus adapted to produce interference, a holder for the optical element to be tested, means for rotating said holder about a fixed axis, an optical system between said interference apparatus and said element, a spherical mirror, a fixed bar lying in a direction bisecting the angle between the incident and emergent axes of the element, and a linkage system connecting said means, said optical system, said spherical mirror and said fixed bar, whereby predetermined displacements of said optical system and said spherical mirror are made in a plane at right angles to said fixed axis as said holder is rotated.

In testimony that we claim the foregoing as our invention we have signed our names this 27th day of March, 1925.

THOMAS SMITH.
JOHN HENDRI DOWELL.